United States Patent [19]

Mueller

[11] Patent Number: 4,670,519
[45] Date of Patent: Jun. 2, 1987

[54] NARROWING THE MOLECULAR WEIGHT DISTRIBUTION OF POLYTETRAHYDROFURAN

[75] Inventor: Herbert Mueller, Frankenthal, Fed. Rep. of Germany

[73] Assignee: BASF Aktiengesellschaft, Ludwigshafen, Fed. Rep. of Germany

[21] Appl. No.: 823,581

[22] Filed: Jan. 29, 1986

[30] Foreign Application Priority Data

Feb. 15, 1985 [DE]  Fed. Rep. of Germany ....... 3505152

[51] Int. Cl.⁴ .............................................. C08F 8/50
[52] U.S. Cl. ................................. 525/342; 525/326.8
[58] Field of Search ........................................ 525/342

[56] References Cited

U.S. PATENT DOCUMENTS 4,363,924 12/1982 Mueller et al. ...................... 549/509
4,480,124 10/1984 Mueller ............................... 568/617

FOREIGN PATENT DOCUMENTS 800659 12/1968 Canada .
854958 11/1960 United Kingdom .

*Primary Examiner*—Joseph L. Schofer
*Assistant Examiner*—Bernard Lipman
*Attorney, Agent, or Firm*—John H. Shurtleff

[57] ABSTRACT

The molecular weight distribution of polytetrahydrofuran which has been obtained by polymerization of tetrahydrofuran using a cationic catalyst is narrowed by a process in which the polytetrahydrofuran is heated at from 80° to 280° C. in the presence of a bleaching earth or a zeolite as a catalyst.

11 Claims, No Drawings

NARROWING THE MOLECULAR WEIGHT DISTRIBUTION OF POLYTETRAHYDROFURAN

The present invention relates to a process for narrowing the molecular weight distribution or polytetrahydrofuran by heating with a bleaching earth of a zeolite.

The polymerization of tetrahydrofuran (THF) to polytetrahydrofuran (PTHF) was discovered by Meerwein et al. in 1930, and is described in Angew. Chem. 72 (1960), 927. The relevant prior art includes the monograph entitled Polytetrahydrofuran by P. Drefuss, Gordon and Breach Science Publishers, New York, London, Paris 1982. PTHF is becoming increasingly important commercially and is used, for example, for the preparation of polyurethanes and polyesters.

PTHF is obtained by polymerization of THF using a cationic catalyst. Like all polymeric compounds, it is composed of molecules of different degrees of polymerization. The width of the molecular weight distributed can vary, depending on the polymerization process selected. Frequently, a Gaussian distribution is observed. The molecular weight distribution of PTHF is rather broad and frequently deviates from the Gaussian distribution in that the higher molecular weight fractions predominate over the low molecular weight fractions, or vice versa. The uniformity of the molecular weight distribution is defined as the ratio of the weight average molecular weight ($M_w$) to the number average molecular weight ($M_n$). The number average molecular weight is obtained by dividing the weight of a sample by the number of molecules of which it is composed. The weight average molecular weight, on the other hand, is the sum of the products formed from fractional weights and molecular weights divided by the sum of the weights of the individual fractions. The molecular weight distribution is therefore defined by the quotient $M_w/M_n$, which is also referred to as the heterogeneity factor. It is determined, for example, by molecular weight measurements by the light scattering method and osmometry, or from the distribution curves obtained with the aid of gel permeation chromatography. The values for $M_w$ and $M_n$ can be determined from these measured distribution curves. The heterogeneity factor roughly corresponds to the molecular weight distribution $M_{vis}/M_n$, as described in, for example, German Pat. No. 2,453,114. $M_{vis}$ is referred to as the bulk viscosity. It is an empirical value derived from the relationship 20 g $M_{vis}$=0.493 log (viscosity, at 40° C., in poise)+3.0646. This relationship is based on the fact that, in the case of a polymer having a broad molecular weight distribution, the viscosity increases exponentially with the molecular weight. For example, it is known that the viscosity of polymers having a broad distribution is greater than that of polymers having a narrow molecular weight distribution, the polymers having the same structure and the same number average molecular weight. $M_{vis}/M_n$ is generally from 10 to 20% smaller than $M_w/M_n$.

The molecular weight distribution of PTHF has a considerable effect on the properties of the polyurethane polymers or polyester polymers prepared from it. Very generally, it is true that the mechanical properties of the finished products, in particular of structural materials which are produced from PTHF are better the more uniform the molecular sizes of the PTHF, employed. Conversely, end products having poor properties are obtained when a PTHF possessing a broad molecular weight distribution is used.

Since the preparation of PTHF gives polymers having a relatively broad molecular weight distribution, there is a need either to provide a polymerization process which gives polymers having a narrow molecular weight distribution or to find a possible method for narrowing the molecular weight distribution of PTHF by means of an after-treatment.

Canadian Pat. No. 800,659 states that a PTHF having a fairly narrow molecular weight distribution is obtained if the polymerization of THF is terminated before equilibrium is reached. Such a process is difficult to reproduce since products having different mean molecular weights are obtained depending on the time at which the polymerization is terminated. Furthermore, the molecular weight distribution is narrowed by only a small amount by this measure, and the resulting conversion of the monomers is lower than in the case of the equilibrium reaction, thus making the process more expensive.

German Pat. No. 2,453,114 describes a process for the preparation of a PTHF having a fairly narrow molecular weight distribution, in which a PTHF starting material is partially depolymerized to tetrahydrofuran at from 120° to 150° C. and in the presence of a crosslinked ion exchange resin in the acid form. Although this process gives satisfactory results; it has the disadvantage that crosslinked ion exchange resins are expensive and only have limited stability to the substrate at elevated temperatures. The process can therefore only be carried out in a very narrow temperature range from 120° to 150° C. However, even at these low temperatures, pronounced swelling of the ion exchange resins and contamination of the PTHF by small amounts of these resins cannot be completely avoided. The temperature limit restricts the depolymerization rate and makes the process expensive.

It is an object of the present invention to provide a process which permits the preparation of a PTHF having a narrow molecular weight distribution from a PTHF having a broad molecular weight distribution at a high reaction rate, contamination of the product by catalyst components being avoided. Moreover, the amount of catalyst used should be small and the catalyst costs should be low. Finally, the catalyst must be physiologically tolerated if, due to adverse circumstances, it remains in a small amount in the polymer.

We have found that this object is achieved by a process for narrowing the molecular weight distribution of polytetrahydrofuran, which is obtained by polymerization of tetrahydrofuran using a cationic catalyst, by heating the polytetrahydrofuran in the presence of a catalyst and simultaneously distilling off tetrahydrofuran, wherein the polytetrahydrofuran is heated at from 80° to 280° C. and a bleaching earth or a zeolite is used as the catalyst.

In the process of the invention, the starting material used is a PTHF obtainable by a conventional method. PTHF is obtained by polymerization of THF using a cationic catalyst. In general, the PTHF has a number average molecular weight of from 650 to 3000, a molecular weight distribution ($M_w/M_n$) of from 1.5 to 4, and a viscosity of from 1 to 70 poise (at 40° C.). In general, the narrowing of the molecular weight distribution by these method according to the invention is carried out with the starting materials so that a PTHF having a molecular weight distribution ($M_w/M_n$) of from 1.2 to 2.5 is obtained for the abovementioned molecular weight range. The lower value can be assigned to the products of low molecular weight, while the higher value may be assigned to the products of high molecular weights of up to 3000. This desired narrowing of the molecular weight distribution is achieved, for example, if from 10 to 40, preferably from 15 to 25, % by weight of the PTHF used are depolymerized under the conditions of the novel process. It is possible to show that the molecules having a lower molecular weight are somewhat more rapidly degraded than those having a high molecular weight, although there is no theoretical basis for this. At depolymerization temperature below 150° C., the phenomenon is more pronounced than at higher temperatures. As soon as about 20–40% of the original PTHF has been depolymerized, the molecular weight distribution curve approaches the shape of an ideal Gaussian distribution.

The catalysts used for the process according to the invention are bleaching earths or zeolites.

Bleaching earths are described in, for example, Ullman, Enzyklopädie der technischen Chemie, 3rd edition, Vol. IV, pages 541–545. Examples of suitable substances are natural or synthetic bleaching earths, in particular aluminum hydrosilicates or aluminum magnesium hydrosilicates of the montmorillonite type which can be activated by acids and are available commercially, for example under the name ®Tonsil. Synthetic bleaching earths are described in, for example, British Pat. No. 834,958. Commercial hydrated bleaching earths are advantageously dehydrated prior to use, for example at from 100° to 200° C., preferably from 100° to 150° C., in the course of from 1 to 8, preferably 2 to 4, hours, under atmospheric or, preferably, reduced pressure. The resulting catalysts then contain less than 1% by weight of water. However, commercial hydrated bleaching earths can also be used directly. These catalysts have a somewhat lower activity in the initial phase, but this can be easily remedied by a slight increase in temperature during the operation to narrow the molecular weight distribution.

Instead of bleaching earths, it is also possible to use zeolites. Examples of suitable zeolites are naturally occurring calcium aluminosilicates and alkali metal aluminosilicates, and synthetic zeolites of the general formula $M_{x/n}[(AlO_2)_x(SiO_2)_y]H_2O$, where M is, for example Na, K, Ca or Ba, n is the charge on the metal cation, $M_n^\oplus$, and x, y and z are simple integers. Al can be replaced with B or Fe.

Bleaching earths are used in preference to the zeolites.

The process is carried out, for example, by using the catalyst in suspended form. Advantageous results are obtained if the catalyst is used in an amount of, for example, from 0.1 to 10, preferably from 0.2 to 5, % by weight, based on the total batch. It is also possible to use larger or smaller amounts. The catalyst suspended in the reaction mixture can be separated off from the polymer by a conventional physical separation method, such as filtration or centrifuging, and reused for any number of further batches. To avoid discoloration and peroxide formation in the PTHF, it is advisable to separate off and recycle the catalyst in the absence of oxygen, for example under a dry protective gas such as nitrogen, argon or carbon dioxide.

In another embodiment, the catalyst is pressed to give moldings and arranged in a fixed bed. To prepare the catalyst moldings, the bleaching earth or zeolite is kneaded with a binder, in particular water, and the resulting mixture is pressed to give moldings. Water is then removed from the water-containing moldings at above 100° C., preferably from 200° to 700° C., under atmospheric or reduced pressure, in the presence or absence of a gas which is inert under the reaction conditions, for example a noble gas, such as helium or argon, or, in particular, nitrogen, until the abovementioned water content is reached. The pressed catalysts can be in the form of, for example, spheres, rings, cylinders or tablets. Where spherical catalysts are used, the spheres generally have a diameter of from 2 to 15 mm, preferably from 3 to 6 mm. The cylindrical moldings used generally have a length of from 2 to 15 mm and a diameter of from 2 to 6 mm. Non-spherical and non-cylindrical moldings generally have a volume corresponding to that of the cylindrical moldings.

The molded catalysts are arranged as a bed in a reaction vessel, for example a tube furnace or shaft furnace. The selected dimension of the catalyst bed is preferably determined by the desired flow conditions and any supply of heat which may be necessary. The reaction vessels, which in general are columnar, can have a cross-section of any shape, for example square or elliptical. Preferably, however, elongated cylindrical reaction vessels are used. The ratio of the internal diameter to the length of the reaction vessel is in general from 1:2 to 1:100, preferbly from 1:10 to 1:40. The reaction vessels may be vertical or horizontal or may assume an intermediate position. However, vertical tube furnaces in which the tube diameter is, for example, from 10 to 100 mm are preferably used. If exact temperature control is of less importance, the reaction vessel used may also be a simple shaft furnace with or without product recycling.

The process for narrowing the molecular weight is carried out by bringing the PTHF with a broad molecular weight distribution into contact with the catalyst at from 80° to 280° C., preferably from 100° to 180° C., in the selected reaction vessel. By increasing the temperature, the reaction is very greatly accelerated, and in most cases the reaction temperature is therefore chosen so that the reaction rate at the desired reaction temperature meets the requirements set. In many cases, the process is carried out at below 150° C. At these relatively low temperatures, the reaction rate is still sufficiently high, and the molecular weight distribution is more effectively narrowed than at higher temperatures. In any case, virtually any reaction rate can be achieved by suitably selecting the reaction temperature and the catalyst concentration. The reaction can be carried out continuously or batchwise. In the continuous procedure, the polymer mixture used flows through the reactor charged with the fixed catalyst bed. In this case, the final polymer obtained is free from catalyst components, so that physical separation of polymer and catalyst is not necessary. If the product still contains dissolved tetrahydrofuran after the treatment according to the invention, such amounts of THF can easily be removed by evaporating down the resulting polymer. This gives a PTHF which is suitable for all fields of use.

The advantageous result of the novel process was unexpected since, when THF copolymers and an alkylene oxide are heated with a bleaching earth to about 100° C., the content of oligomeric cyclic ethers in the copolymers is reduced (cf. European Pat. No. 6,107). Obviously, the cyclic ethers are decomposed into their components, whereas the hyroxyl-containing polymers remain unaffected when PTHF is treated according to the invention. It is also known that bleaching earths are capable of polymerizing THF itself at about 100° C. (cf. German Pat. No. 1,226,560 and British Pat. No. 854,958).

In the process described in European Pat. No. 6,107, the residual content of cyclic ethers in the product is generally from 1.5 to 3%. If an attempt is made to remove these ethers by increasing the temperature to, for example, above 130° C., pronounced discoloration and damage to the polymer are observed, depending on the temperature and residence time (European Pat. No. 6,107, page 3, lines 60–63). Surprisingly, these harmful effects which arise from an increase in the temperature do not occur in the novel process up to 160° C. when the process is carried out under atmospheric pressure. If the process according to the invention is operated under from 1 to 100, preferably from 10 to 70, bar, temperatures up to 200° C. can be employed without adversely affecting the quality of the polymer. This increases the reaction rate several times, which is very particularly advantageous for the continuous procedure.

EXAMPLE 1

1500 parts by weight of PTHF having a molecular weight of 1021 and a heterogeneity factor $M_w/M_n$ of 2.2 and 70 parts by weight of the bleaching earth available commercially under the name Tonsil® Optimum FF are initially taken in a stirred reactor having a capacity of 2000 parts. The reactor contents are heated to 110° C. with the aid of an internal coil. At as low a temperature as this elimination of THF begins, and the THF is condensed via a descending condenser connected to the stirred reactor. The THF distilled off is chemically pure and contains about 7% by weight of water at the beginning of the reaction. Toward the end of the reaction, ie. when about 30% of the polytetrahydrofuran used has been depolymerized, the THF distilled off contains only from 2 to 3.5% of water. The course of the reaction and the result obtained are summarized in the Table below. The heterogeneity factor $M_w/M_n$ was calculated from the weight average molecular weight ($M_w$) and the number average molecular weight ($M_n$), which were determined by gel permeation chromatography. The GPC analysis was carried out at 23° C., using THF as the solvent. A three-column combination with a plate number of about 30,000, a differential refractometer (available commercially under the name Knauer Dual Detektor) as the detector, and a line UV photometer (254 nm) in a cell are used. Calibration was effected using polystyrene fractions having a narrow distribution.

placed by 3 mm extrudates of bleaching earth of the same type, the molded bleaching earth being arranged as a fixed bed. 23% of PTHF are depolymerized, and the end polymer obtained has a molecular weight of 1300 and a heterogeneity factor $M_w/M_n$ of 1.9.

EXAMPLE 3

The procedure described in Example 1 is followed, except that, instead of the bleaching earth, the synthetic zeolite obtainable commercially under the name KC Perlkator® D 10-A (powdered) is used, and the reaction is carried out at 125° C. A very similar result is obtained.

I claim:

1. A process for narrowing the molecular weight distribution of polytetrahydrofuran which has been obtained by polymerization of tetrahydrofuran using a cationic catalyst, which method comprises:
   heating the polytetrahydrofuran for depolymerization in the presence of a bleaching earth or a zeolite as a catalyst while simultaneously distilling off tetrahydrofuran, at a temperature from 80° to 280° C., said initial polytetrahydrofuran to be depolymerized having a number average molecular weight of from 650 to 3000, a molecular weight distribution (Mw/Mn) of from 1.5 to 4 and a viscosity of from 1 to 70 poise (at 40° C.), and said heating being carried out for a period of time sufficient only to depolymerize from 10 to 40% by weight of the initial polytetrahydrofuran and to produce a reduced molecular weight distribution (Mw/Mn) of from 1.2 to 2.5.

2. A process as claimed in claim 1, wherein the polytetrahydrofuran is heated at a temperature from 100° to 180° C.

3. A process as claimed in claim 1, wherein the narrowing procedure is carried out continuously over a fixed catalyst bed.

4. A process as claimed in claim 1, wherein the narrowing procedure is carried out under a pressure from 1 to 100 bar.

5. A process as claimed in claim 1, wherein the heating to narrow the molecular weight distribution is carried out until 15 to 25% by weight of the initial polytetrahydrofuran is depolymerized.

6. A process as claimed in claim 1, wherein the depolymerization catalyst is used in an amount based on the total batch of the polymer of from 0.01 to 10% by weight.

7. A process as claimed in claim 1, wherein the depolymerization catalyst is used in an amount based on the total batch of the polymer, of from 0.3 to 5% by weight.

| Reaction time [h] | Reaction temperature [°C.] | PTHF depolymerized in % by weight | Molecular weight | Heterogeneity factor $M_w/M_n$ | Water content of THF in % by weight | Viscosity mPa · s 40° C. |
|---|---|---|---|---|---|---|
| 0 | — | 0 | 1021 | 2.2 | — | 45 |
| 1.2 | 110 | 4.8 | 1390 | 2.1 | 5.6 | — |
| 2.2 | 110 | 9.8 | 1520 | 2.0 | 4.8 | — |
| 3.2 | 110 | 14.6 | 1580 | 1.9 | 3.9 | — |
| 4.2 | 110 | 19.5 | 1700 | 1.85 | 3.2 | — |
| 5.2 | 110 | 25.0 | 1870 | 1.8 | 2.7 | — |
| 6.2 | 110 | 29.3 | 2040 | 1.7 | 2.2 | 80 |

EXAMPLE 2

The procedure described in Example 1 is followed, except that the mixture is heated at 150° C. for 3 hours under 20 bar and the powdered bleaching earth iS re- 8. A process as claimed in claim 1, wherein the depolymerization process is carried out at a temperature up to 160° C. at atmospheric pressure and up to 200° C. at an elevated pressure up to 70 bar.

9. A process as claimed in claim 1, wherein the catalyst used for the depolymerization is a bleaching earth.

10. A process as claimed in claim 1, wherein the catalyst used for the depolymerization is a zeolite.

11. A process as claimed in claim 1, wherein the polymer of reduced molecular weight distribution is recovered substantially free of the tetrahydrofuran monomer.

* * * * *